Figure 1:
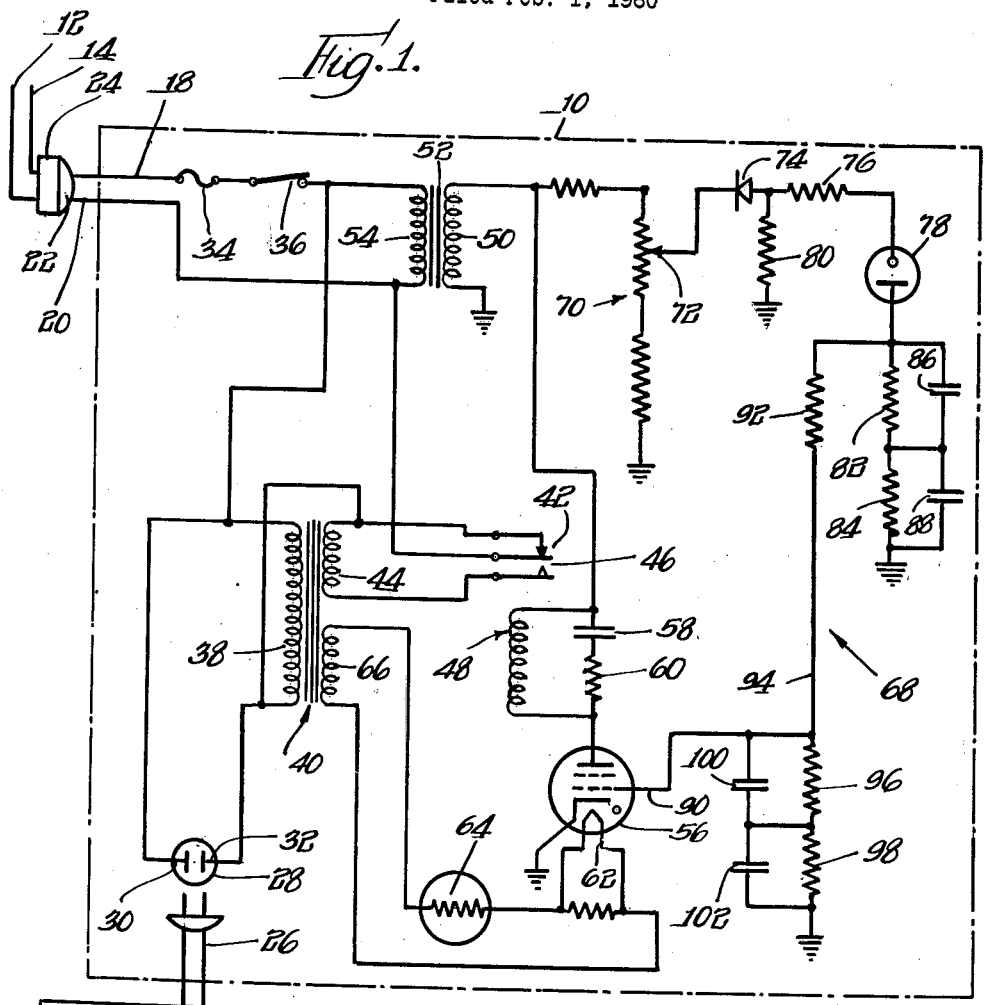

Feb. 26, 1963  F. H. OSBORNE ETAL  3,079,544
VOLTAGE COMPENSATING POWER SUPPLY UNIT
Filed Feb. 1, 1960

INVENTORS
Fred H. Osborne
BY John H. Riggs
Olson & Trexler attys.

United States Patent Office 3,079,544
Patented Feb. 26, 1963

3,079,544
VOLTAGE COMPENSATING POWER
SUPPLY UNIT
Fred H. Osborne, Snyder, and John H. Riggs, Kenmore, N.Y., assignors to The Wurlitzer Company, Chicago, Ill., a corporation of Ohio
Filed Feb. 1, 1960, Ser. No. 5,763
7 Claims. (Cl. 323—45)

The present invention relates to the operation of electrical appliances, particularly phonographs, in localities where the power line voltage may vary over a range which exceeds the power voltage range within which a phonograph, for example, will operate acceptably. In some areas of Latin America, for instance, the line voltage at household outlets may vary from a high of 130 volts during the day to a low of 60 to 65 volts at night. A phonograph which will tolerate a peak voltage of 130 volts will not operate satisfactorily at the low voltages sometimes present in these areas.

One object is to provide, for energizing a phonograph or similar electrical appliance, a new and improved electric power supply unit which, when connected between a power line and an electrical appliance, will provide a continuous supply of electric power to the appliance which is automatically maintained by the unit within the range of acceptable operating voltages for the appliance, even though the line voltage may drop below an acceptable operating voltage for the appliance.

Another object is to provide, for energizing an electrical appliance, a new and improved electric power supply unit which when connected to a power line will operate automatically to provide appliance operating power at a stepped up voltage when the line voltage drops below a predetermined value.

Another object is to provide an electric power supply unit as recited in the previous objects which is inherently safe in its operation in that it will not produce an output voltage in excess of a safe upper limit even in the event of operational or structural failures of the unit.

A further object is to provide a voltage compensating power supply unit, as recited, having a long, trouble free service life, in which the service life is not shortened by prolonged operation of the unit on either normal or subnormal line voltages, or by extensively repeated fluctuations of the line voltage between normal and subnormal values.

Another object is to provide, for supplying operating power to an electrical appliance, a voltage compensating electric power unit of the character recited in which moving parts used in the unit are limited to a single relay which is not subject to malfunctioning.

A further object is to provide, for use with an electrical appliance, a voltage compensating unit having a new and improved construction which provides high operating efficiency and reliability, while at the same time effectively minimizing the manufacturing cost of the unit.

Figure 2:
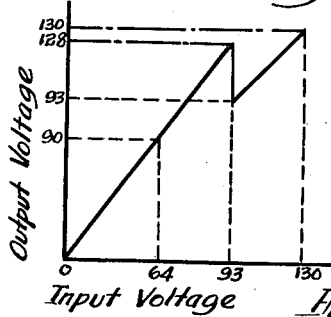

Other objects and advantages will appear from the following description of the invention taken with reference to the drawings, in which:

FIGURE 1 is a diagrammatic illustration of a power supply unit forming the illustrated embodiment of the invention; and FIG. 2 is a graphic illustration of the electrical operating characteristics of the unit.

Having reference to the drawings in greater detail, the voltage compensating, power supply unit 10 forming the exemplary embodiment of the invention illustrated is connected, in FIG. 1, between two alternating current power supply lines, 12, 14 and an electrically operated phonograph 16, in this instance a jukebox.

As shown, the voltage compensating unit 10 comprises a first input terminal or lead 18 and a second input terminal or lead 20 connectable through a plug 22 and a socket 24 with the alternating current supply lines 12, 14. Typically, the socket 24 will be an ordinary wall outlet in a room which is supplied through the lines 12 and 14 with A.C. power at ordinary household voltages. In localities in which the voltage compensating unit 10 can be used to advantage, the voltage supplied by the lines 12 and 14 may at times be abnormally low, particularly during hours of peak load on the power supplying utility system. As previously intimated, the voltage available at the outlet socket 24 may vary in some localities from a peak voltage of 130 volts down to a minimum voltage of 60 to 65 volts. While the jukebox 16 will operate satisfactorily at a voltage of 130 volts it will not operate satisfactorily at a voltage of only 65 volts.

However, as will presently appear, the power supply unit 10 operates automatically when plugged into the socket 24 to provide a supply of electrical operating power to the phonograph 16 which is continuously and automatically maintained at a voltage suitable for operating the phonograph 16 even when the voltage at the outlet 24 drops below an acceptable value for powering the phonograph.

As shown, a power cord 26 from the phonograph 16 is plugged into an outlet socket 28 of the unit 10 which comprises a first outlet line or terminal 30 and a second outlet line or terminal 32.

The first input terminal 18 of the unit 10 is connected through a fuse 34 and a normally closed switch 36 with the first outlet terminal 30. The primary winding 38 of a voltage compensating transformer 40 is connected through the closed line switch 36 between the first input terminal 18 and the second output terminal 32. The second input terminal 20 is connected through a normally closed first relay switch 42 with the second output terminal 32.

Thus, when the switch 42 is closed, the input terminals 18 and 20 of the unit 10 are connected directly to the output terminals 30, 32 to supply power to the connected phonograph 16 at the same voltage at which power is supplied through the power supply lines 12 and 14.

Closure of the switch 42 also applies the voltage at the wall socket 24 directly to the primary winding 38 of the voltage compensating transformer 40. Energization of the input winding 38 induces a voltage in a first secondary winding 44 of the transformer 40. The secondary winding 44 is related to the primary winding 38 in such manner that a normal voltage of 117 volts applied to the primary winding 38 induces 30 volts in the secondary 44.

The secondary winding 44 of the transformer 40 is connected between the second output terminal 32 of the unit 10 and the second input terminal 20 through a normally open switch 46.

The two switches 42 and 46 are operated simultaneously by means of a common relay operator 48 which, upon being energized, opens the switch 42 and closes the switch 46. Upon deenergization of the relay operator 48, the switch 42 returns to its normally closed position and the switch 46 returns to its normally open position.

Opening of the switch 42 and closure of the switch 46 connects the transformer secondary winding 44 in series between the second input terminal 20 and the second output terminal 32. The connections of the winding 44 to the second input and output terminals are polarized in relation to the two input terminals 18, 20 in such manner that the voltage induced in the secondary 44 by the flow of current through the transformer primary 38 is cumulative with the voltage applied to the input terminals 18, 20.

Thus, upon opening of the switch 42 and closing of the switch 46, the voltage supplied to the output terminals 30, 32 is the sum of the voltage induced in the secondary 44 and the voltage supplied to the wall outlet 24. Moreover, the addition of the voltage induced in the secondary 44 to the voltage supplied at the wall outlet 24 provides an increased voltage at the outlet socket 28, and hence an increased flow of current in the transformer primary 38. The increase in the current flow in the transformer primary 38, due to the addition of the voltage induced in the secondary 44 to the voltage otherwise applied to the primary 38, increases the voltage induced in the secondary 44 to provide a further increase in the voltage supplied to the outlet terminals 30, 32.

Energization of the relay operator 48 for the two switches 42, 46 is controlled automatically, in accordance with the voltage supplied to the wall outlet 24 to automatically step up the voltage at the output terminals 30, 32 of the unit 10, to provide an increased operating voltage for the phonograph 16 when the voltage at the wall outlet 24 drops below a predetermined value, which can be adjusted in accordance with the voltage requirements of the phonograph or other attached appliance.

Operating power for energizing the relay operator 48 is supplied by the secondary winding 50 of a control power transformer 52 having a primary 54 connected across the input terminals 18, 20. The transformer 52 is an isolation transformer having a one-to-one input-output voltage ratio.

Energization of the electrical relay operator 48 is controlled by a thyratron 56 connected in series with the coil of the relay operator across the secondary winding 50 of the isolation transformer 52. The voltage applied to the plate of the thyratron 56 from the isolation transformer secondary 50 biases the thyratron to conduct on alternate half cycles. A capacitor 58 and a resistor 60 connected in series with each other and in parallel with the coil of the relay operator 48 serve to maintain energization of the relay operator coil during the nonconducting half cycles of the thyratron 56.

As shown, a cathode heater 62 for the thyratron 56 is energized by power supplied through a negative resistance 64 from a second secondary winding 66 of the transformer 40.

Operation of the thyratron 56 and hence energization of the relay operator 48 are controlled automatically, in accordance with the voltage supplied at the wall socket 24, by means of a control circuit 68 connected across the secondary winding 50 of the isolation transformer 52. Thus, as shown, one side of the secondary 50 is grounded. The other side of the secondary is connected to a grounded potentiometer 70 having an output terminal 72 the voltage of which is adjusted by adjustment of the potentiometer.

The output terminal 72 of the potentiometer 70 is connected through a rectifier 74 and a resistor 76 to one side of a voltage regulator tube 78. The output side of the rectifier 74 and the input side of the resistor 76 are grounded through a high value resistor 80.

The output side of the voltage regulator tube 78 is grounded through two resistors 82, 84 connected in series. Two capacitors 86, 88 are connected in parallel across the respective resistors 82, 84, as shown in FIG. 1. This arrangement of the two resistors 82, 84 in series, together with the arrangement of the two capacitors 86, 88, in series with each other and in parallel across the respective resistors 82, 84, provides for continued safe and proper operation of the unit 10 in the event of shorting of either of the capacitors, as will presently appear.

The output side of the voltage regulator tube 78 is connected directly to a control grid 90 of the thyratron 56 through a high value resistor 92.

A conductor 94, connecting the resistor 92 with the thyratron grid 90, as shown in FIG. 1, is grounded through two resistors 96, 98 in series with each other. Two capacitors 100 and 102 are connected in parallel across the respective resistors 96, 98. This arrangement of the resistors 96, 98 and capacitors 100, 102 prevents a loss of the control voltage on the grid 90 in the event of shorting of one of the capacitors 100, 102.

The construction and arrangement of the control circuit 68 thus described is such that when a normal voltage is supplied to the wall socket 24, the voltage regulator tube 78 conducts in a direction which produces a voltage drop across the resistors 82 and 84 and across the resistors 92, 96 and 98. The voltage drop across the grounded resistors 96, 98 is applied to the grid 90 and biases the thyratron 56 to cut off. A negative bias on the grid 90 will cut off the thyratron 56, since it tends to conduct only on alternate half cycles.

So long as the thyratron 56 is cut off, the relay operator 48 is deenergized and the switch 42 continues to supply power directly to the phonograph 16 at the same voltage at which power is supplied to the wall outlet 24.

However, when the voltage at the wall outlet 24 drops below a certain value, which is predetermined by adjustment of the potentiometer 70, the voltage regulator tube 78 ceases to conduct at a rate sufficient to produce a voltage drop across the resistors 96, 98 adequate for maintaining the thyratron 56 in its cut off condition.

In this instance, the potentiometer 70 is adjusted to effect firing or conducting of the thyratron 56 when the voltage supplied to the input terminals 18, 20 drops below 93 volts.

Operation of the unit 10 is depicted graphically in FIG. 2. As indicated in this figure, the output voltage supplied to the phonograph 16 is equal to the input voltage supplied to the compensating unit 10 when the input voltage to the unit exceeds 93 volts. This follows from the fact that the thyratron 56 is biased to cut off and serves as an electronic switch to deenergize the relay operator 48 as long as the input voltage to the unit 10 remains above 93 volts.

When the input voltage to the unit 10 drops below 93 volts, the thyratron 56 switches automatically to its conducting condition, as described, to energize the relay operator 48 to connect the voltage compensating secondary winding 44 in series with the second output terminal 32, as previously recited. It will be recalled that the full voltage supplied to the output terminals 30, 32 is applied to the primary 38 of the compensating transformer 40. The effect of this is to step up the output voltage supplied to the phonograph 16 to 128 volts when the input voltage to the unit 10 drops to 93 volts.

Decreases in the input voltage to the unit 10 below the critical changeover value of 93 volts is accompanied by proportionate decreases in the output voltage supplied to the phonograph 16. Yet, the step up in the voltage supplied to the phonograph is sufficient to maintain effective operation of the phonograph even when the input voltage to the unit 10 drops to a value as low as 60 volts. Thus, as indicated in FIG. 2, the unit 10 supplies an output voltage of 90 volts to the phonograph 16 when a voltage of 64 volts is supplied to the compensating unit.

When the input voltage again increases above the critical changeover voltage, 93 volts in this instance, the voltage regulator tube 78 again conducts to produce a biasing voltage on the thyratron grid 90 to cut off the thyratron 56 and deenergize the relay actuator 48, which is biased to open the switch 46 and close the switch 42 to apply the input voltage to the unit 10 directly to the output socket 28.

It will be noted that the voltage is stepped up in the compensating unit 10 only when the thyratron 56 is conducting. Hence, in the event of the thyratron becoming inoperative, due to a burned out heater 62 or the like, the relay actuator 48 is deenergized and the unit "fails safe" to connect the output terminals 30, 32 directly to the input terminals 18, 20. This guards against a step up in the output voltage when the input voltage exceeds the critical changeover value, in this instance 93 volts.

As previously intimated, the critical voltage below which the compensating unit operates to step up its output voltage is preset to a desired value by adjusting the potentiometer 70.

It will be appreciated that the invention is not necessarily limited to use of the exact structure illustrated, but includes variants and equivalents within the spirit and scope of the invention as defined by the claims.

The invention is claimed as follows:

1. For use with a phonograph, a voltage compensating electrical power supply unit comprising, in combination, first and second power input terminals, a first power output terminal connected to said first input terminal, a second power output terminal, a voltage compensating transformer having a primary winding connected between said second output terminal and said first input terminal, a normally closed first switch connecting said second input terminal to said second output terminal, a normally open second switch, a relay operator connected to open said first switch and close said second switch upon energization of the operator, said transformer including a secondary winding connected in series with said second switch between said second output terminal and said second input terminal and having a polarity relative to the polarity of said input terminals which makes the induced voltage on said secondary winding cumulative with the voltage across said input terminals, a control transformer having a primary winding connected between said input terminals, a thyratron, means connecting said thyratron and said relay operator in series across the secondary winding of said control transformer to bias the thyratron to a conducting condition for energizing said operator; a control network connected to said secondary winding of said control transformer and including a potentiometer, a rectifier, a voltage regulator tube and a resistance in series; and means connected to apply the voltage drop across said resistance to a grid of said thyratron to bias the thyratron to cut off to maintain said relay operator in a deenergized condition only when the voltage applied to said input terminals exceeds a critical value predetermined by adjustment of said potentiometer.

2. A voltage compensating electrical power supply unit comprising, in combination, first and second power input terminals, a first output terminal connected to said first input terminal, a second power output terminal, a voltage compensating transformer having a primary winding connected between said first and second output terminals, a normally closed first switch connecting said second input terminal to said second output terminal, a normally open second switch, a relay operator connected to open said first switch and close said second switch upon energization of the operator, said transformer including a secondary winding connected in series with said second switch between said second output terminal and said second input terminal and having a polarity relative to the polarity of said input terminals which makes the induced voltage on said secondary winding cumulative with the voltage across said input terminals, a control transformer having a primary winding connected between said input terminals, a thyratron, means connecting said thyratron and said relay operator in series across the secondary winding of said control transformer to bias the thyratron to a conducting condition for energizing said operator; a control circuit connected across said secondary winding of said control transformer and including a potentiometer, a rectifier, a constant voltage discharge tube and a resistance in series; two filtering capacitors connected in series with each other and in parallel with said resistance, a filter network connecting the voltage regulator end of said resistance to a grid of said thyratron to bias the thyratron to cut off to deenergize said relay operator when the voltage applied to said input terminals exceeds a critical value predetermined by adjustment of said potentiometer, and said filter network including two capacitors in series.

3. A voltage compensating electrical power supply unit comprising, in combination, a power input terminal, a power output terminal, a normally closed first switch connecting said input terminal with said output terminal, a voltage compensating transformer, means for energizing said transformer by power supplied through said input terminal, a normally open second switch interconnecting the secondary of said transformer with said input and output terminals to connect said secondary in series with said input and output terminals upon closure of said second switch and opening of said first switch, an electrical operator connected to open said first switch and close said second switch upon energization of the electrical operator, said transformer secondary having a polarity relative to the polarity of said input terminal which makes the voltage induced in said secondary cumulative with the voltage on said input terminal upon closure of said second switch, electrical energizing means for said switch operator energized by power supply through said input terminal and including a thyratron connected to energize said switch operator, a control network for said thyratron interconnected with said input terminal for energization therethrough in accordance with the voltage thereon; said control network including a voltage regulator tube, a rectifier and a control resistor in a series; and said control network including means for applying the voltage on said control resistor to a grid of said thyratron to bias the thyratron to cut off only when the voltage applied to said input terminal exceeds a predetermined value.

4. In a voltage compensating electrical power supply unit, the combination of two input conductor means, output conductor means, a voltage compensating transformer energized through said input conductor means, switch means interconnected with secondary of said transformer and with said input and output conductor means and having a first operating position which connects said input conductor means directly to said output conductor means and having a second operating position which connects the secondary of said transformer between said input and output conductor means to apply to said output conductor means, the sum of the voltage applied to said input conductor means and the voltage induced in said secondary, an electrical switch operator coacting with said switch means to shift the latter between said first and second positions thereof when the switch operator is energized, an electronic switch connected to energize said switch operator, a control resistor, a control network connected to respond to the voltage applied to said input conductor means and including rectifier means connected to said resistor to apply a voltage thereto corresponding to the voltage applied to said input conductor means, and means interconnecting said resistor with said electronic switch to control said electronic switch to effect energization of said switch operator in accordance with the voltage on said resistor.

5. In a voltage compensating electrical power supply unit, the combination of two input conductors, two output conductors, a voltage compensating transformer energized through said input conductors, switch means interconnected with the secondary of said transformer and with said input and output conductors and having a first operating position which connects said input conductors directly to said output conductors and having a second operating position which connects the secondary of said transformer between said input and output conductor to apply to said output conductors the sum of the voltage applied to said input conductors and the voltage induced in said secondary, an electrical switch operator coacting with said switch means to shift the latter between said first and second positions thereof upon energization of the switch operator, a thyratron connected to energize said switch operator, a control network connected to respond to the voltage applied to said input conductors and coacting with said thyratron to apply a switch controlling voltage thereto normally to cut off the thyratron and to effect conducting of the thyratron to energize said switch operator to shift said switching means to said second position thereof only when the voltage applied to said input conductors drops below a predetermined value.

6. A voltage compensating electrical power supply unit comprising, in combination, two power input terminals, a voltage compensating transformer energized through said input terminals, two power output terminals, means including a normally closed first switch connecting said input terminals with said output terminals, a normally open second switch, an electrical switch operator connected to open said first switch and close said second switch upon energization of the switch operator, said transformer including a secondary winding connected in series with said second switch between said input terminals and said output terminals and having a polarity relative to the polarity of said input terminals which makes the induced voltage on said secondary winding cumulative with the voltage across said input terminals upon opening of said first switch and closing of said second switch, a control circuit for said switch operator energized through said input terminals and including an electronic switch connected to energize said switch operator, a control resistance, a control network coupled with said input terminals and including rectifying means connected with said control resistance to apply a voltage thereto corresponding to the voltage applied to said input terminals, two filtering capacitors connected in series with each other and in parallel with said control resistance, and means interconnecting said resistance with said electronic switch to control said switch operator in accordance with the voltage on said resistance.

7. A voltage compensating electrical power supply unit comprising, in combination, first and second power input terminals, a first output terminal connected to said first input terminal, a second power output terminal, a voltage compensating transformer having a primary winding connected between said first and second output terminals, a normally closed first switch connecting said second input terminal to said second output terminal, a normally open second switch, an electrical operator connected to open said first switch and close said second switch upon energization of the operator, said transformer including a secondary winding connected in series with said second switch between said second output terminal and said second input terminal and having a polarity relative to the polarity of said input terminals which makes the induced voltage on said secondary winding cumulative with the voltage across said input terminals, electrical energizing means for said switch operator energized by power supplied from said input terminals and including a thyratron connected to energize said operator, a control network for said thyratron connected to respond to the voltage across said input terminals, said network including a voltage regulator tube and a resistance in series and including means connected to apply the voltage on said resistance to a grid of said thyratron to bias the thyratron to cut off when the voltage applied to said input terminals exceeds a predetermined value.

References Cited in the file of this patent
UNITED STATES PATENTS

| | | |
|---|---|---|
| 2,071,984 | Minneci | Feb. 23, 1937 |
| 2,695,378 | Irvin | Nov. 23, 1954 |
| 2,830,253 | Sleeper | Apr. 8, 1958 |
| 2,944,206 | Brahm | July 5, 1960 |